(12) United States Patent
Nauta

(10) Patent No.: US 7,894,089 B2
(45) Date of Patent: Feb. 22, 2011

(54) SYSTEM FOR PROCESSING PRINT JOBS IN A NETWORK

(75) Inventor: Gadze C. Nauta, Nuenen (NL)

(73) Assignee: Oce Technologies B.V., Venlo (NL)

( * ) Notice: Subject to any disclaimer, the term of this patent is extended or adjusted under 35 U.S.C. 154(b) by 2045 days.

(21) Appl. No.: 10/780,860

(22) Filed: Feb. 19, 2004

(65) Prior Publication Data

US 2004/0165216 A1 Aug. 26, 2004

(30) Foreign Application Priority Data

Feb. 20, 2003 (EP) .................................. 03075552

(51) Int. Cl.
- *G06F 3/12* (2006.01)
- *G06K 15/00* (2006.01)
- *H04N 1/00* (2006.01)

(52) U.S. Cl. ................... 358/1.15; 358/1.14; 358/1.16; 358/1.6

(58) Field of Classification Search ................ 358/1.12, 358/1.14–1.16, 1.6; 400/61; 709/203, 228; 705/34; 714/46; 455/557

See application file for complete search history.

(56) References Cited

U.S. PATENT DOCUMENTS

| | | | |
|---|---|---|---|
| 5,699,493 A * | 12/1997 | Davidson et al. | 358/1.15 |
| 5,935,262 A * | 8/1999 | Barrett et al. | 714/46 |
| 5,970,224 A * | 10/1999 | Salgado et al. | 358/1.16 |
| 6,288,790 B1 | 9/2001 | Yellepeddy et al. | |
| 6,600,569 B1 * | 7/2003 | Osada et al. | 358/1.12 |
| 6,618,566 B2 * | 9/2003 | Kujirai et al. | 399/79 |
| 6,633,395 B1 * | 10/2003 | Tuchitoi et al. | 358/1.14 |
| 6,678,068 B1 * | 1/2004 | Richter et al. | 358/1.15 |
| 6,863,455 B2 * | 3/2005 | Blom et al. | 400/61 |
| 6,916,127 B2 * | 7/2005 | Wanda | 400/61 |
| 6,985,243 B1 * | 1/2006 | Matsueda | 358/1.15 |
| 7,034,954 B1 * | 4/2006 | Utsunomiya | 358/1.16 |
| 7,054,020 B2 * | 5/2006 | Gassho et al. | 358/1.15 |
| 7,058,600 B1 * | 6/2006 | Combar et al. | 705/34 |
| 7,145,673 B1 * | 12/2006 | Lin | 358/1.15 |
| 7,145,683 B2 * | 12/2006 | Tuchitoi et al. | 358/1.15 |
| 7,180,626 B1 * | 2/2007 | Gassho et al. | 358/1.6 |
| 7,190,469 B1 * | 3/2007 | Gomi | 358/1.14 |
| 7,190,477 B2 * | 3/2007 | Ferlitsch | 358/1.15 |
| 7,191,237 B2 * | 3/2007 | Jodra et al. | 709/228 |
| 7,286,250 B2 * | 10/2007 | Kujirai et al. | 358/1.15 |
| 7,298,505 B2 * | 11/2007 | Ueda | 358/1.14 |

(Continued)

FOREIGN PATENT DOCUMENTS

JP    10-003367    1/1998

(Continued)

*Primary Examiner*—Edward L. Coles
*Assistant Examiner*—Satwant K Singh
(74) *Attorney, Agent, or Firm*—Birch, Stewart, Kolasch & Birch, LLP

(57) ABSTRACT

A system for processing print jobs in a network containing a plurality of client stations adapted to submit print jobs, and at least one printing device containing a control unit and a printer, the control unit including storage means for storing print jobs submitted to the printing device. In the system a print account job containing account information of a print job is generated and submitted, wherein the print account job is linked to the corresponding print job by a linking identifier. A stored print job is validated for printing when a corresponding valid account job has been received.

21 Claims, 4 Drawing Sheets

U.S. PATENT DOCUMENTS

| | | | |
|---|---|---|---|
| 2002/0169002 A1* | 11/2002 | Imbrie et al. | 455/557 |
| 2003/0065713 A1* | 4/2003 | Quach et al. | 709/203 |
| 2005/0073709 A1* | 4/2005 | Kujirai et al. | 358/1.14 |

FOREIGN PATENT DOCUMENTS

| | | |
|---|---|---|
| JP | 2002-086835 | 3/2002 |
| JP | 2002-278721 | 9/2002 |
| JP | 2002-287932 | 10/2002 |

* cited by examiner

SYSTEM FOR PROCESSING PRINT JOBS IN A NETWORK

This non-provisional application claims priority under 35 U.S.C. §119(a) on Patent Application No. 03075552.A, filed in Europe on Feb. 20, 2003, which is herein incorporated by reference.

BACKGROUND OF THE INVENTION

The present invention relates to a system for processing print jobs in a network, comprising a plurality of client stations adapted to submit print jobs, and at least one printing device comprising a control unit and a printer, the control unit comprising storage means for storing print jobs submitted to the printing device.

In various applications of systems of this type it is important to submit account information with the print job. This account information specifies information related to the print job, such as the user, the project, the phase of the project, whether the print can be billed, remarks, etc. In the known systems the account information is added to the job ticket. Generally, this allows the user to add only limited account information. Many printing devices are adapted to understand various formats of job tickets. If in a system of the above-mentioned type account information is to be added to the job ticket, this means that all ticket formats that are supported by the printing device must be adapted to accommodate the addition of account information. Moreover, adding account information to print jobs having a job ticket, requires modifying the existing job ticket to insert the account information, which is rather cumbersome.

SUMMARY OF THE INVENTION

The present invention provides a system of the above-mentioned type wherein account information can be added to the print job in a very flexible manner.

To this end means are provided for generating and submitting a print account job containing account information of a print job, wherein the print account job is linked to the corresponding print job by a linking identifier, and by means for validating stored print jobs for printing, wherein the validating means receives account jobs and validates a corresponding print job for printing in case a valid account job has been received.

In this manner a system is obtained wherein account information is submitted in a print account job which is generated as a second print job linked to the first print job. The print account job contains the account information for the actual print job encoded in a suitable format used by the printing device, such as RCF, OJT or PostScript. The specification of existing job ticket formats does not have to be modified and it is not necessary to modify print jobs having a job ticket.

BRIEF DESCRIPTION OF THE DRAWINGS

The present invention will be further explained by reference to the drawings showing an example of the system of the invention in a schematical manner, wherein.

DETAILED DESCRIPTION OF THE INVENTION

Figure 1:
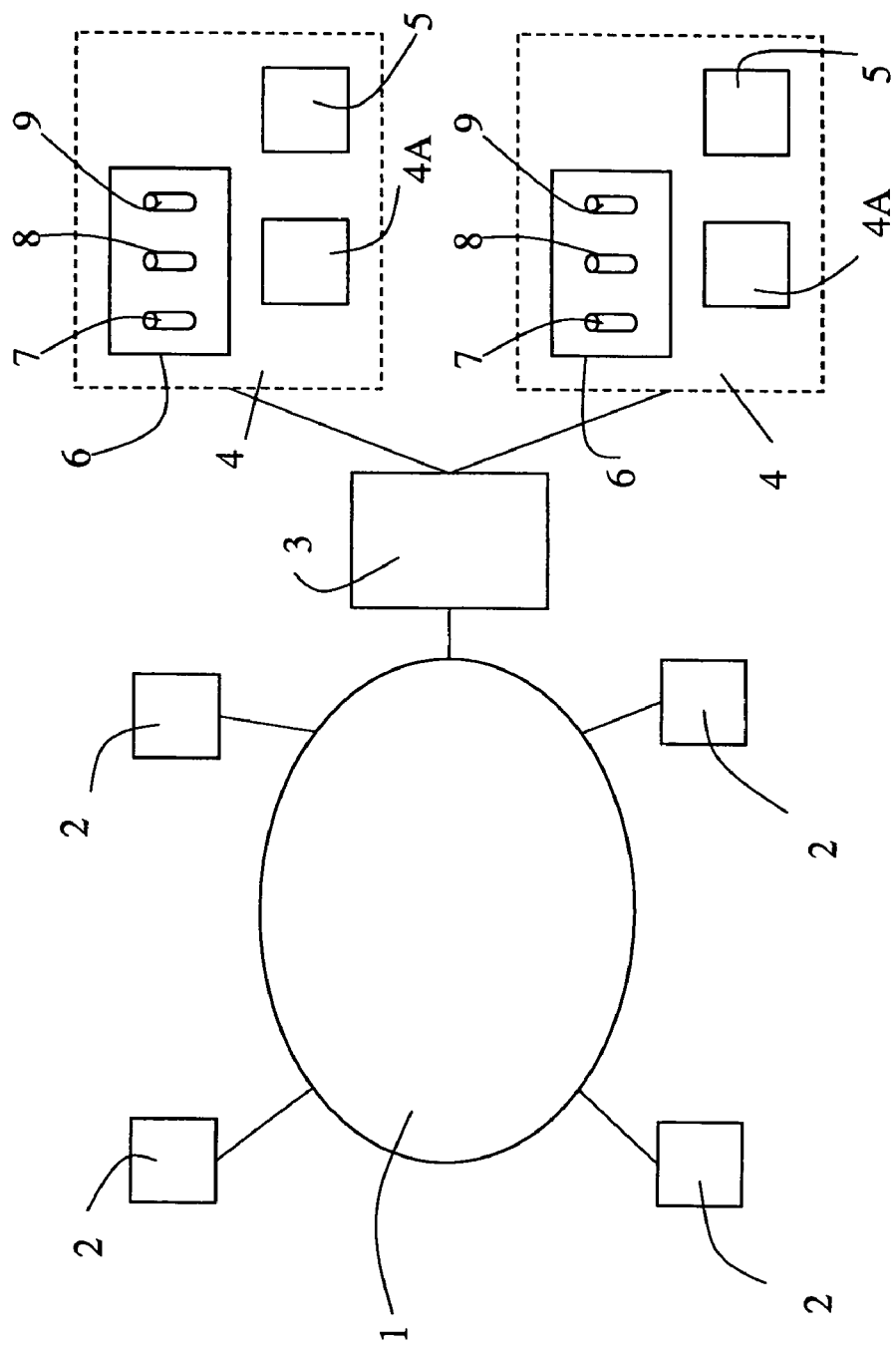
FIG. 1 shows a diagram of an embodiment of the system of the present invention.

FIG. 1 shows a system for processing print jobs in a network 1 comprising a plurality of client stations or client PC's 2, a print server 3 and two printing devices 4. Each printing device 4 comprises a control unit 4A and a printer 5. The control unit 4A can be implemented as any suitable logic controller or PC including storage means 6 for storing print jobs submitted to the printing device 4. In the embodiment described, the storage means 6 comprises a holding queue 7 for storing print jobs received by the printing device 4 and a printing queue 8 for storing print jobs which are validated and are ready for printing by the printer 5. Further, the storage means 6 includes a log file 9 for storing account information as will be explained hereinafter In the system of the present invention as shown in FIG. 1, the client stations 2 are adapted to submit print jobs with corresponding account information to a selected printing device 4. A print job comprises a print data file and a job ticket with printing instructions for the printer 5 of the printing device 4 which is selected. These printing instructions are for example the number of copies to be printed, paper size, and finishing information.

Figure 3:
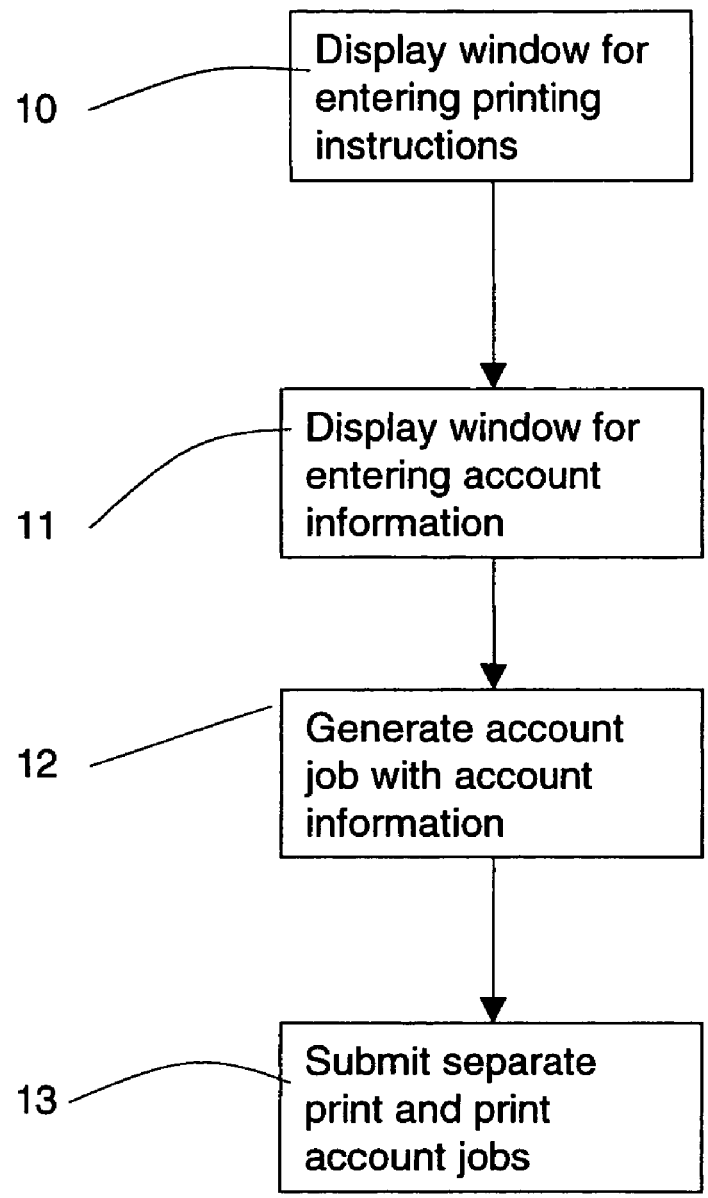
FIG. 3 shows a flow diagram explaining the operation of a client station in the system of the present invention.

Client stations 2 are adapted to run application programs in a usual manner and at least some of the application programs allow a user to print data files, for example a data file representing a text document or a drawing document. To print a data file, the user enters a print command, and as shown in FIG. 3, in step 10, giving a print command results in a job submitter program running on the client station, e.g. a printer driver, to display a user interface window on the monitor of the client station 2. This window allows the user to enter printing instructions. The printing instructions are inserted in a so called job ticket and the job ticket together with the print data file is submitted to the printing device as a print job.

In step 11 the job submitter displays a second window allowing the user to enter account information and the account information is inserted in a print account job which is submitted by the job submitter to the printing device 4 as a separate second print job. The print job and the print account job are linked by a linking identifier. As in most protocols for submitting print jobs, information fields are available for inserting information provided by a user, e.g. the job name field and the user name field, and these fields can be used for inserting the linking identifier. Preferably the job name is used as the linking identifier as the job name field is usually free text. Of course, it is also possible to encode the linking identifier within the job ticket of the print job. However, encoding the linking identifier within the job ticket the print job already has, requires modifying an existing ticket which is a disadvantage.

After entering the account information, the job submitter of the client station 2 generates in step 12 a print account job in the same manner as a print job and this print account job is submitted to the printing device 4 in step 13. It is noted that steps 12 and 13 do not indicate a time sequence. More specifically step 13 does not require that the print job is submitted after generating the print account job. The print job can be submitted before entering the account information.

As mentioned above the print job and the print account job can be linked by the job name and a unique code as in the following example:

Lpr "Tulip Bridge overall view—C715"
Lpr "[account info] Tulip Bridge overall view—C715"

In this example the print job and the print account job are submitted via an Lpr command. The printing device 4 is aware of the special prefix [account info] to recognize the print account job as a job providing account information for a corresponding print job having the same job name and unique code. The unique code is only used to ensure that no two print jobs with the same name exist.

Figure 2:
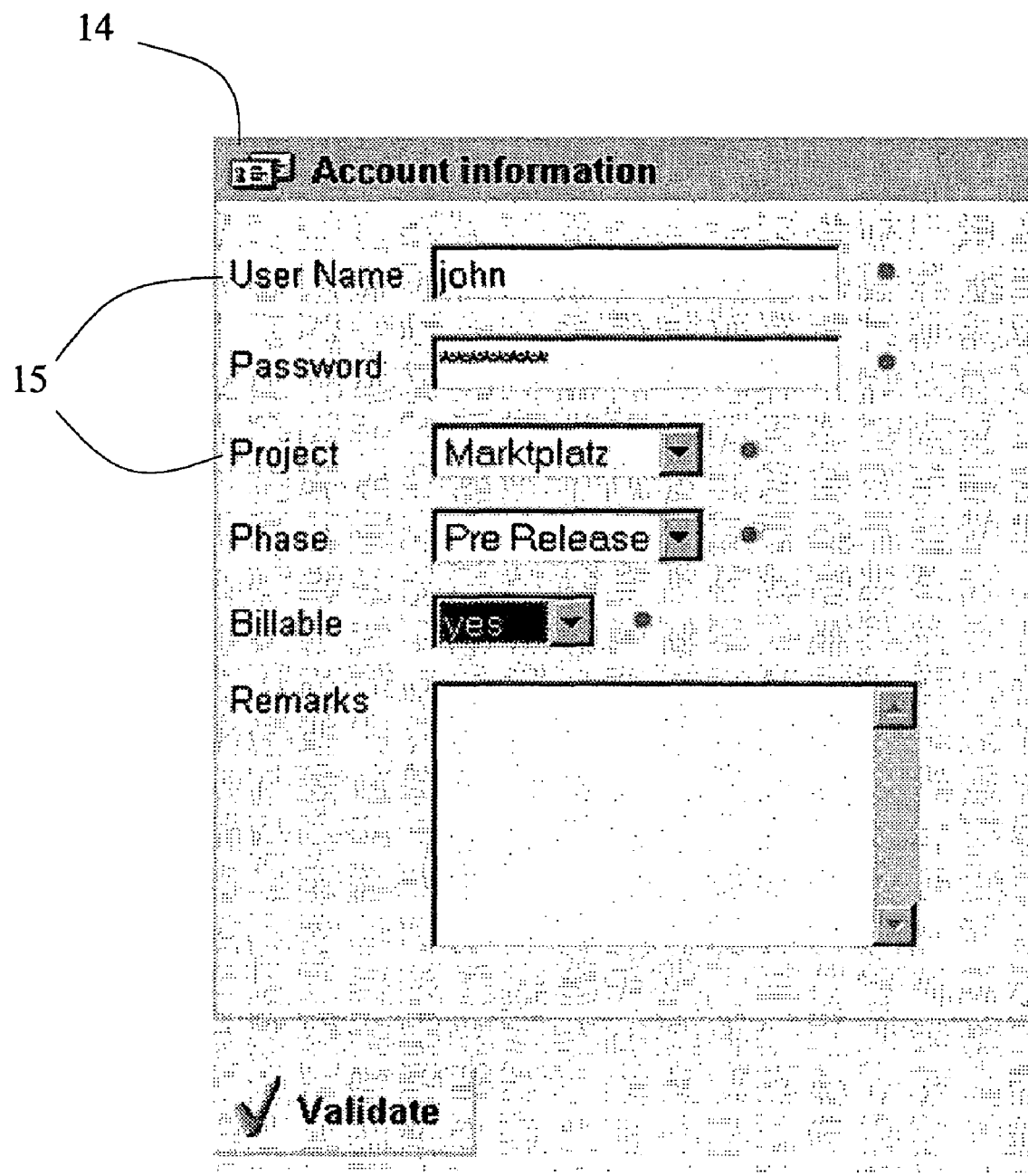
FIG. 2 shows, by way of example, a user interface window for entering account information in the system of the present invention.

Generating a print account job and submitting this print account job as a separate print job to the printing device 4 allows the user of the system to define the account information which has to be provided in a relatively free and flexible manner. FIG. 2 shows by way of example a window 14 having a number of fields 15 for providing account information. This window 14 is displayed in step 11 of FIG. 3 on the monitor of the client station 2.

In a further embodiment of the system of the present invention the print server 3 can be programmed to operate as a server station adapted to intercept print jobs submitted to the printing devices 4 connected to the print server 3. If a print job is intercepted and a corresponding print account job is not received, the print server 3 requests the client station 2 which submitted the print job or as an alternative another client station 2 operating for example as an accounting center, to provide corresponding account information. After receipt of the account information, the print server 3 generates a print account job containing the account information and links this print account job to the corresponding print job, for example by the job name as explained above. Thereafter, the print account job is submitted to the printing device 4. It is noted that the account information can be obtained by the print server 3 for example through presenting a web page on the monitor of the client station 2 in a manner known per se.

As an alternative to obtaining the account information from a client station 2, it is also possible to enter the account information on the print server 3, which account information is submitted to the printing device 4 in the manner described.

Figure 4:
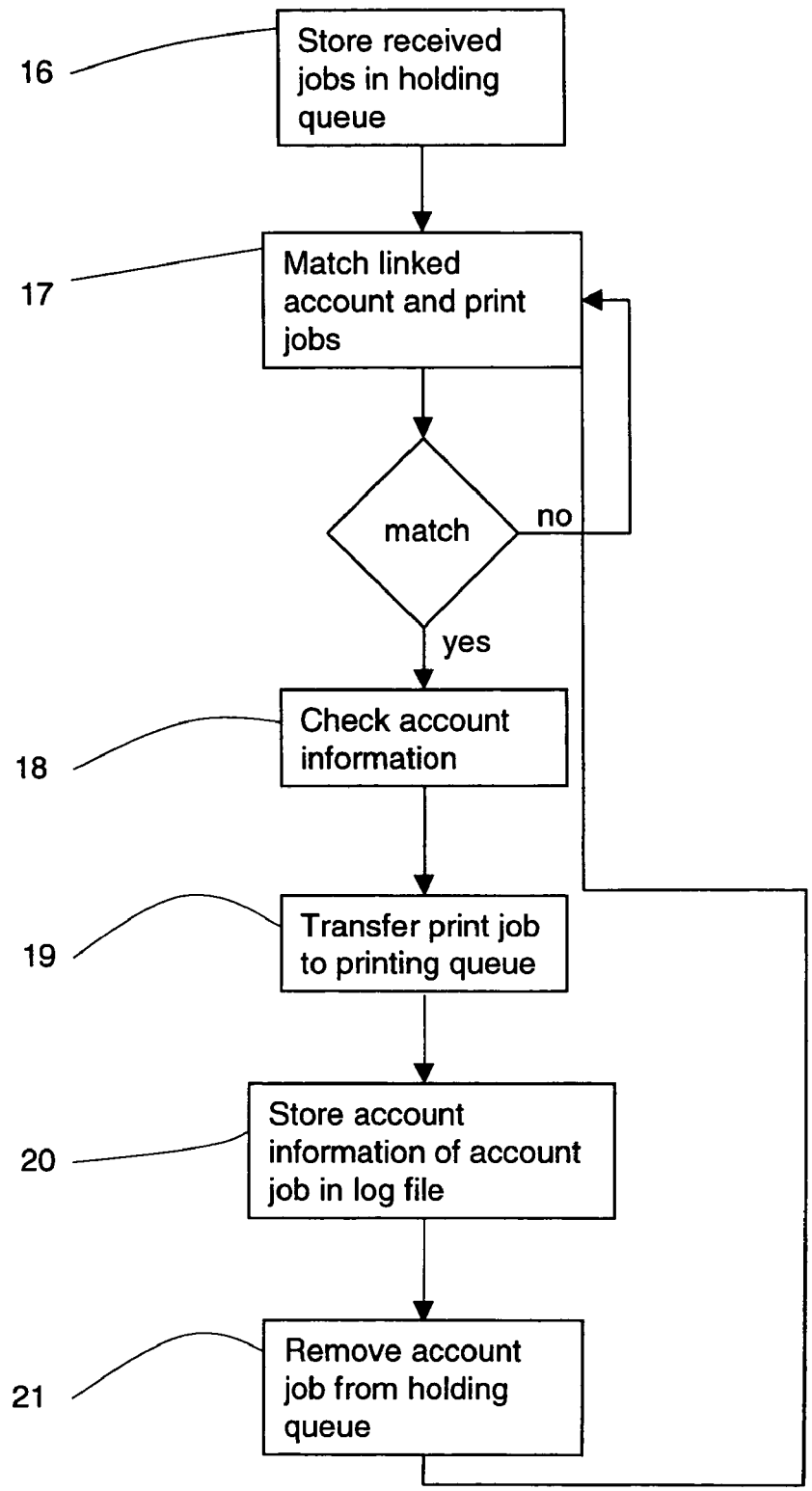
FIG. 4 shows a flow diagram explaining the operation of a printing device in the system of the present invention.

The operation of the printing device 4 will be explained by reference to FIG. 4. In step 16 all received print and print account jobs are stored in the holding queue 7. As mentioned, print account jobs are distinguished from actual print jobs, for example by means of a special prefix [account info]. If a print account job is received, the control unit 4A reads the job name as linking identifier and checks the print jobs in the holding queue 7 to find a print job with a corresponding job name in step 17. If a print account job can be matched with a print job in step 17, the control unit 4A in a next step 18 checks the account information in the print account job and if all account information in the print account job is valid, the corresponding print job is activated and transferred to the printing queue 8 in a next step 19. The account information of the print account job is stored in the account log file 9 in step 20 and in step 21 the print account job is removed from the holding queue 7.

The print jobs in the print queue 8 are printed by the printer 5 in the usual manner.

In another embodiment of the system of the present invention the print server 3 can be programmed to receive print account jobs and to operate in a manner corresponding to the operation of the control unit 4A as described. This means that the print server 3 checks the received print account job and validates the corresponding print job if the account information is valid. The print server 3 submits for example a print validation command which results in printing of the corresponding print job. In this embodiment the account log file 9 can be implemented in the storage means of the print server 3.

It will be understood that the present invention provides a system wherein account information can be added to the print job in a very flexible manner. The account information is submitted to the printing device in a print account job which is generated as a second print job and this second print job is linked to the first print job by a linking identifier which may be the job name. The account job contains the account information for the actual print job encoded in a suitable format used by the printing device, such as RCF, OJT or PostScript.

The invention is not restricted to the above-described embodiments, which can be varied in a number of ways while still falling within the scope of the claims.

What is claimed is:

1. A system for processing print jobs in a network comprising:
   a plurality of client stations configured to submit print jobs, wherein each of the client stations includes means for generating and, with a submission of a print job, submitting a print account job which is generated as a second print job, the print account job containing account information of the print job and linked to the print job by a linking identifier;
   at least one printing device including a control unit and a printer, the control unit including storage means for storing the print jobs and the corresponding print account jobs submitted from the client stations to the printing device; and
   means for validating the stored print jobs for printing, wherein said validating means receives the print account jobs and without user interaction validates a corresponding print job for printing in the case a valid print account job generated as the second print job has been received.

2. The system according to claim 1, wherein the client station comprises a job submitter including said means for generating and submitting the print account jobs.

3. The system according to claim 2, wherein a server station is configured to intercept a submitted print job, said server station comprising means for generating and submitting a print account job containing account information of the intercepted print job, wherein the print account job is linked to the intercepted print job by a linking identifier.

4. The system according to claim 3, wherein the server station is configured to communicate with a client station to obtain account information of the intercepted print job for insertion in the print account job.

5. The system according claim 1, wherein a printer server comprises said means for validating the stored print jobs for printing, and wherein said validating means validates a print job by generating a print validation command for a corresponding print job and submitting the print validation command to the printing device.

6. The system according to claim 1, wherein the control unit of the printing device is configured to receive the print jobs and the corresponding print account jobs, and wherein said validating means are part of the control unit of the printing device.

7. The system according to claim 6, wherein the storage means includes a holding queue, a printing queue and an account log file, and wherein the control unit moves the validated print job from the holding queue to the printing queue to be printed and moves the print account job to the account log file in the case the valid print account job has been received.

8. A printing device, comprising:
   a control unit; and
   a printer,
   wherein the control unit is configured to receive a print job, and a corresponding print account job generated as a second print job, the control unit including:

storage means for storing the print job and the corresponding print account job in a holding queue;

means for validating the stored print job for printing, said validating means being configured to receive the corresponding print account job and without user interaction validate the print job for printing in case the corresponding print account job generated as the second print job is valid.

9. The printing device according to claim 8, wherein the storage means further includes a printing queue and an account log file, and wherein the control unit moves the validated print job from the holding queue to the printing queue to be printed and moves the corresponding print account job to the account log file in the case the corresponding print account job is valid.

10. A client station for use in a system for processing print jobs according to claim 1, wherein the client station is configured to submit print jobs, and wherein a job submitter is provided, including means for generating and submitting a print account job containing account information of a print job, the print account job being linked to the corresponding print job by a linking identifier.

11. A server station for use in a system according to claim 1, wherein the server station is configured to intercept a submitted print job, the server station comprising means for generating and submitting a print account job containing account information of the intercepted print job, wherein the print account job is linked to the intercepted print job by a linking identifier.

12. The server station according to claim 11, which is configured to communicate with a client station to obtain account information of the intercepted print job for insertion in the print account job.

13. A printer server for use in a system according to claim 1, including means for validating stored print jobs for printing, wherein the validating means validates a print job by generating a print validation command for a corresponding print job and submitting the print validation command to a printing device.

14. A computer program embodied on a computer-readable medium comprising program instructions for a computer to operate as a client station in the system of claim 1 when said program runs on the computer.

15. A computer program embodied on a computer-readable medium comprising program instructions for a computer to operate as a control unit of the printing device in the system of claim 1 when said program runs on the computer.

16. A computer program embodied on a computer-readable medium comprising program instructions for directing a computer to operate as a server station in the system of claim 1 when said program runs on the computer.

17. A computer program embodied on a computer-readable medium comprising program instructions for directing a computer to operate as a printer server in the system of claim 1 when said program runs on the computer.

18. The system according to claim 1, wherein the linking identifier is a job name in a job name field of the second print job.

19. The printing device according to claim 8, wherein the corresponding print account job contains account information of the print job and is linked to the print jobs by a linking identifier, and the linking identifier is a job name in a job name field of the second print job.

20. The system according to claim 1, wherein the means for generating and submitting the print account job substantially simultaneously submits the print account job with a submission of the print job, and wherein the second print job is not intended to be printed.

21. The printing device according to claim 8, wherein the corresponding print account job generated as the second print job is substantially simultaneously submitted with a submission of the print job, and the second print job is not intended to be printed.

* * * * *